United States Patent [19]

Filo

[11] Patent Number: 5,047,870
[45] Date of Patent: Sep. 10, 1991

[54] IMAGE REPRODUCTION SYSTEM UTILIZING SINGLE OPERATION SCANNING/REPRODUCING

[75] Inventor: Andrew Filo, Cupertino, Calif.
[73] Assignee: Optum Corporation, Cupertino, Calif.
[21] Appl. No.: 169,791
[22] Filed: Mar. 17, 1988
[51] Int. Cl.⁵ .................................................. H04N 1/04
[52] U.S. Cl. .................................... 358/472; 358/296; 358/909
[58] Field of Search ............. 358/286, 285, 294, 296, 358/101, 213.11, 213.12, 217, 906, 909, 471, 472, 474, 476, 229, 451, 482, 209; 346/76 PH; 382/59, 101

[56] References Cited

U.S. PATENT DOCUMENTS

| | | | |
|---|---|---|---|
| 3,662,103 | 5/1972 | Wildmer et al. | 358/474 |
| 3,707,601 | 12/1972 | Goble | 358/476 |
| 4,075,664 | 2/1978 | Aoki et al. | 358/286 |
| 4,317,137 | 2/1982 | Tompkins | 358/286 |
| 4,319,283 | 3/1982 | Ozawa et al. | 358/286 |
| 4,375,916 | 3/1983 | Levine | 355/5 |
| 4,424,524 | 1/1984 | Daniele | 358/472 |
| 4,438,459 | 3/1984 | Levine | 358/258 |
| 4,492,966 | 1/1985 | Seki et al. | 358/296 |
| 4,495,523 | 1/1985 | Ozawa | 358/293 |
| 4,523,235 | 6/1985 | Rajchman | 358/256 |
| 4,574,317 | 3/1986 | Scheible | 358/285 |
| 4,609,946 | 9/1986 | Thaler | 358/286 |
| 4,611,246 | 9/1986 | Nihei | 358/256 |
| 4,630,127 | 12/1986 | Fuwa | 358/285 |
| 4,641,357 | 2/1987 | Satoh | 382/61 |
| 4,642,699 | 2/1987 | Ohi | 358/280 |
| 4,658,304 | 4/1987 | Tsumekawa et al. | 358/906 |
| 4,660,082 | 4/1987 | Tomohisa et al. | 358/163 |
| 4,667,252 | 5/1987 | Nakamura et al. | 358/286 |
| 4,700,238 | 10/1987 | Ingiyama | 358/283 |
| 4,714,966 | 12/1987 | Saito et al. | 358/906 |
| 4,731,667 | 3/1988 | Watanabe et al. | 358/286 |
| 4,737,858 | 4/1988 | De Baryshe | 358/296 |
| 4,748,516 | 3/1988 | Harano et al. | 358/286 |
| 4,777,533 | 10/1988 | Watanabe | 358/286 |
| 4,809,080 | 2/1989 | Kotani et al. | 358/ |
| 4,839,741 | 6/1989 | Wilson | 358/474 |
| 4,872,063 | 10/1989 | Filo | 358/474 |
| 4,905,090 | 2/1990 | Miyake | 358/296 |
| 4,920,421 | 4/1990 | Stemmle | 358/296 |

FOREIGN PATENT DOCUMENTS 0129476 10/1981 Japan .
0005662 1/1985 Japan .

*Primary Examiner*—James J. Groody
*Assistant Examiner*—Kim Yen Vu
*Attorney, Agent, or Firm*—Keith Kline

[57] ABSTRACT

A scanning imaging system in which the viewing and reproduction functions are integrated into a single scanning head. The scanning system is economical in terms of cost and function, and is useful in many applications such as modem, photocopier and even photographic technologies.

24 Claims, 11 Drawing Sheets

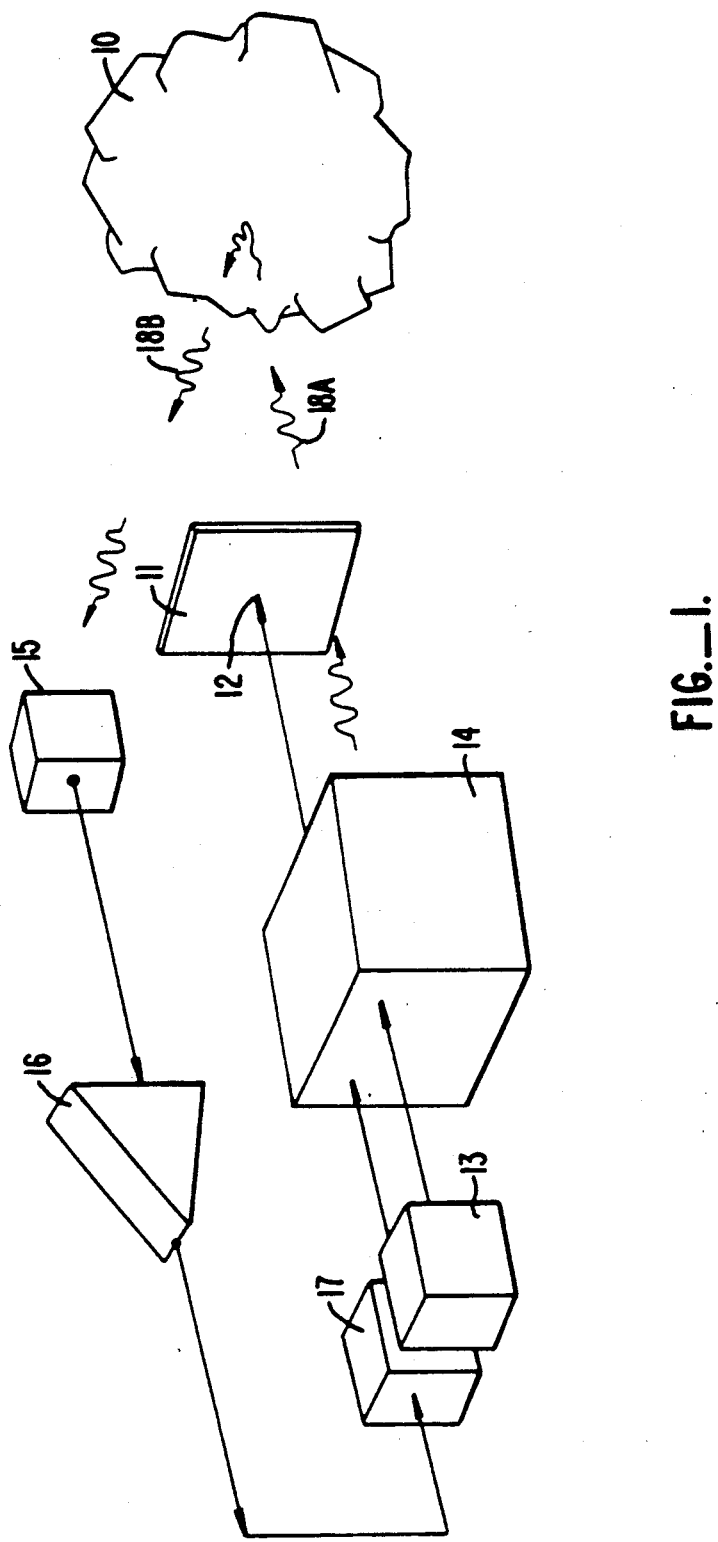
FIG._1.

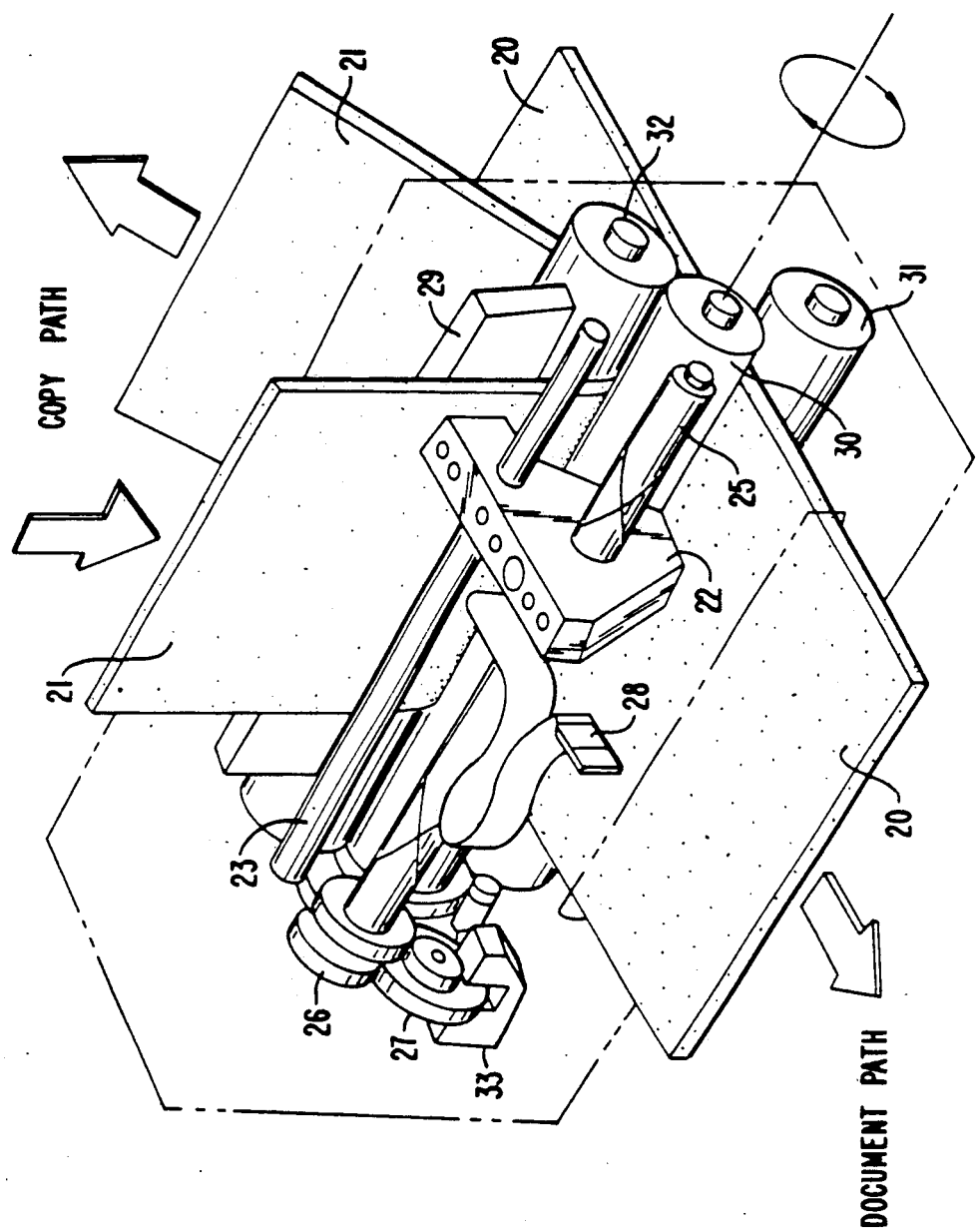
FIG._2A.

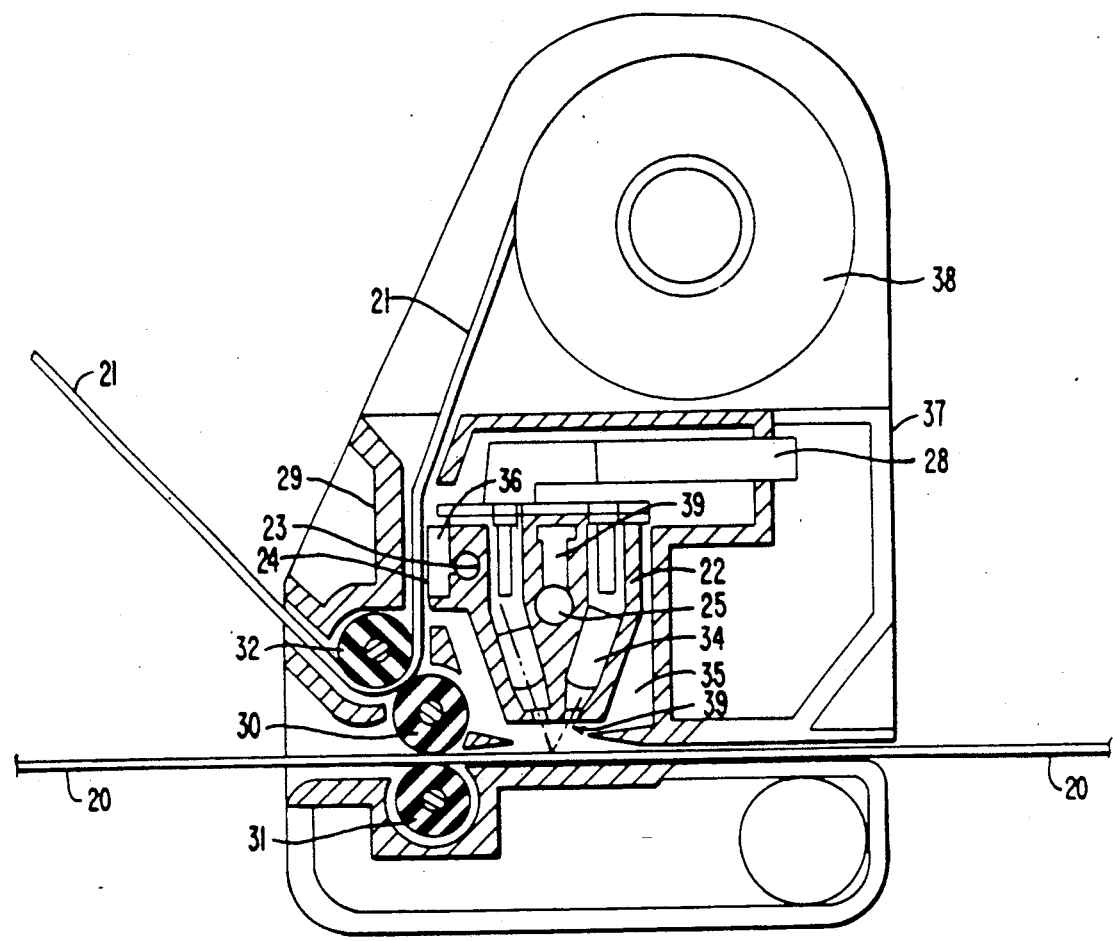
FIG._2B.

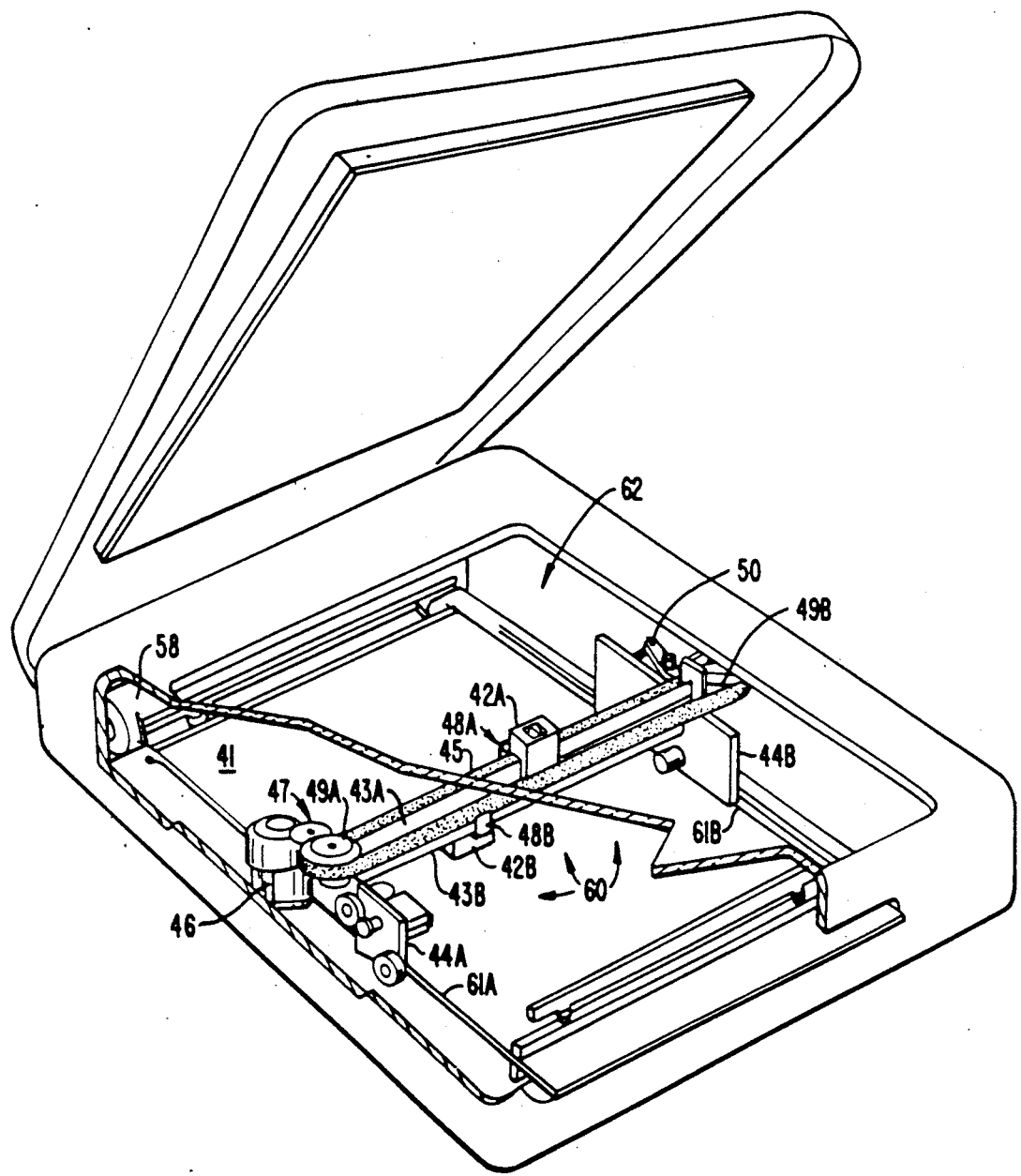
FIG._3A.

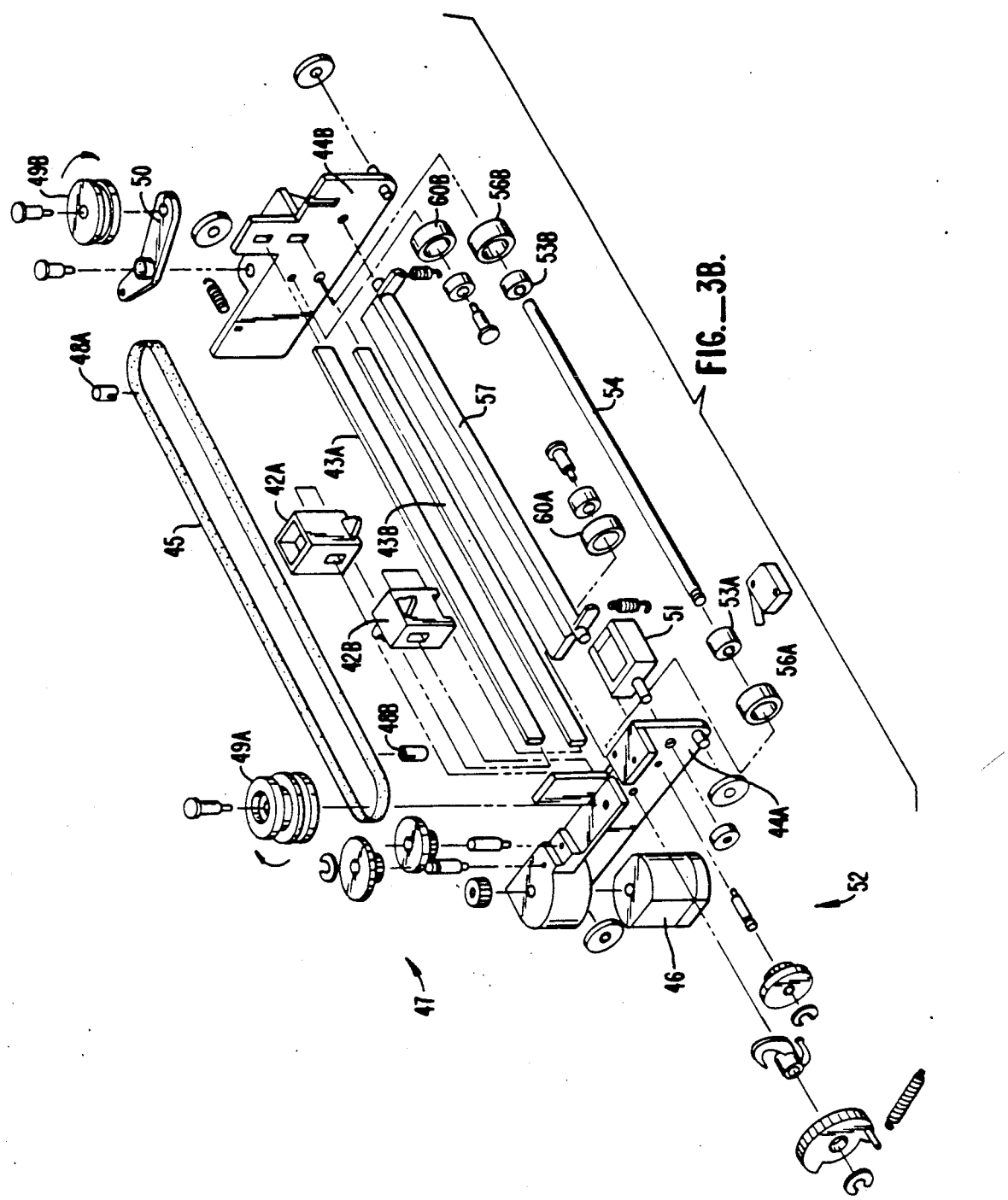

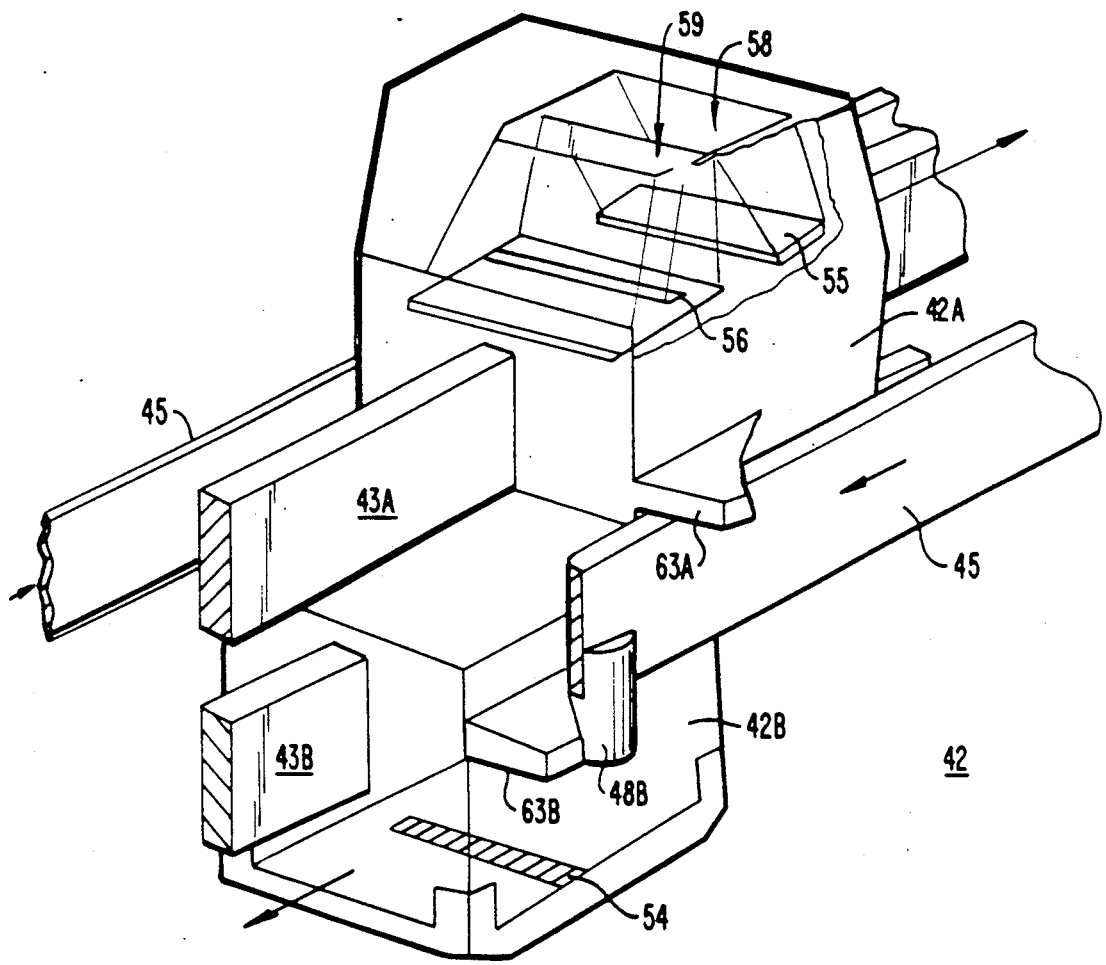
FIG._3C.

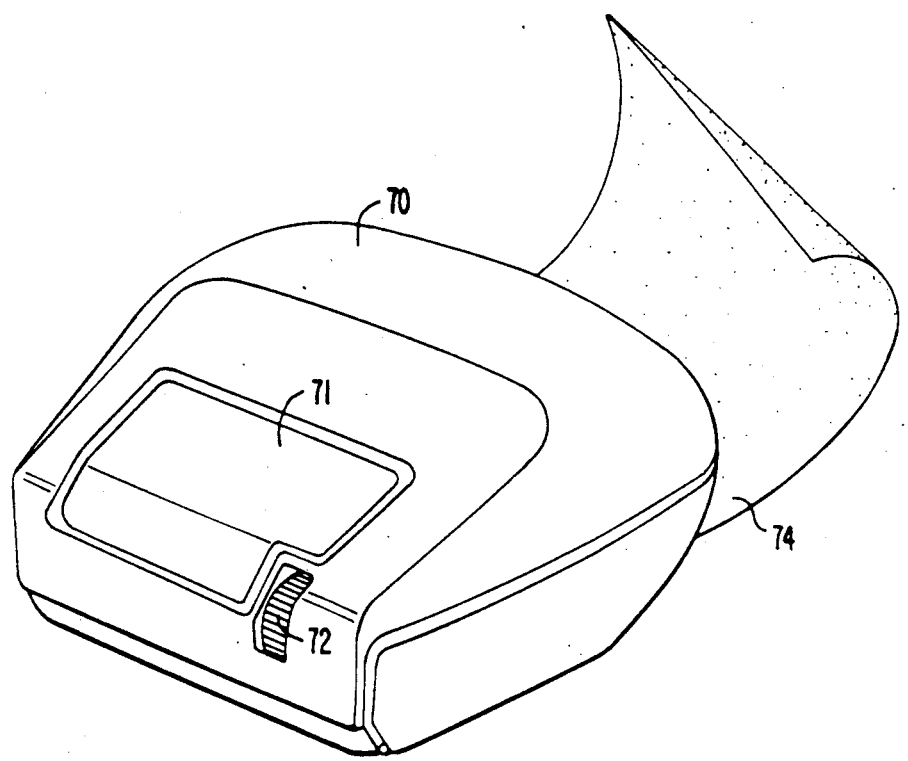
FIG._4A.
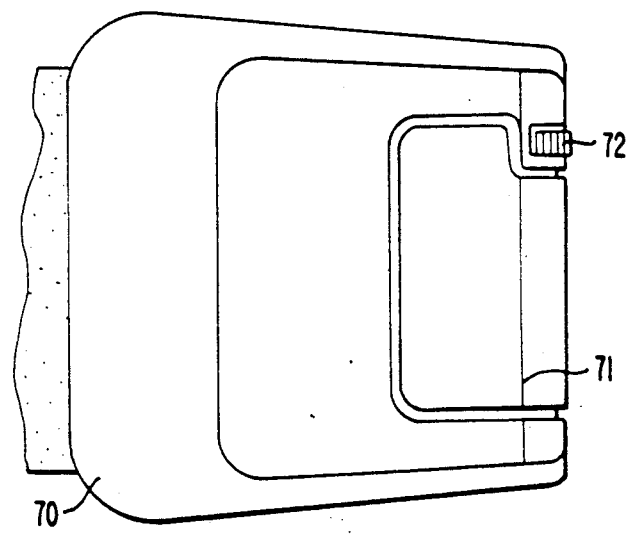
FIG._4B.
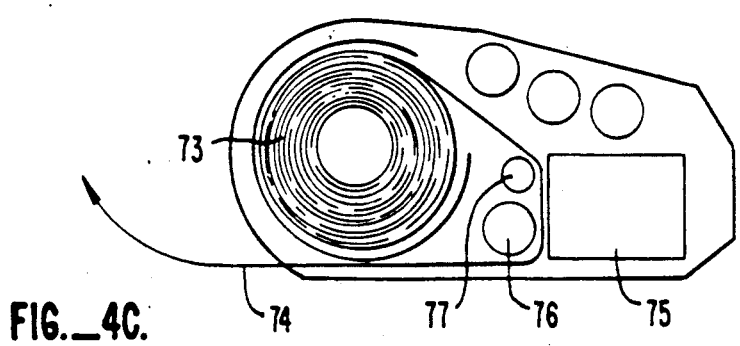
FIG._4C.

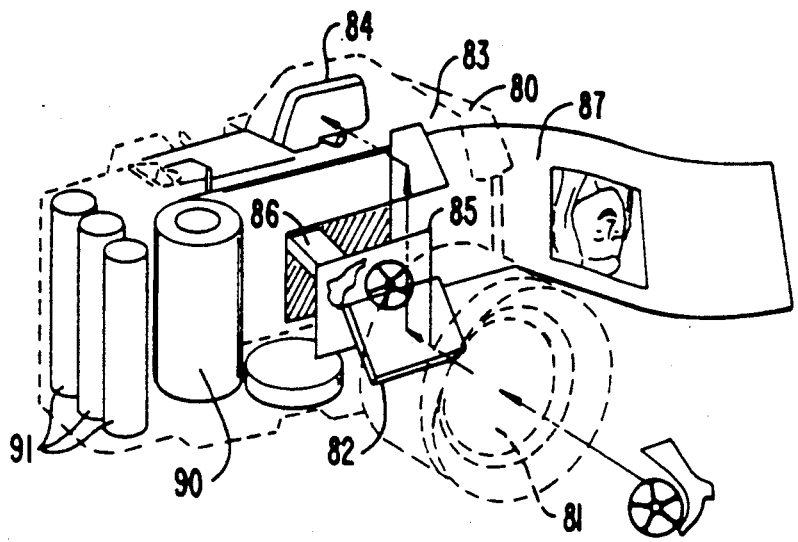
FIG._5A.
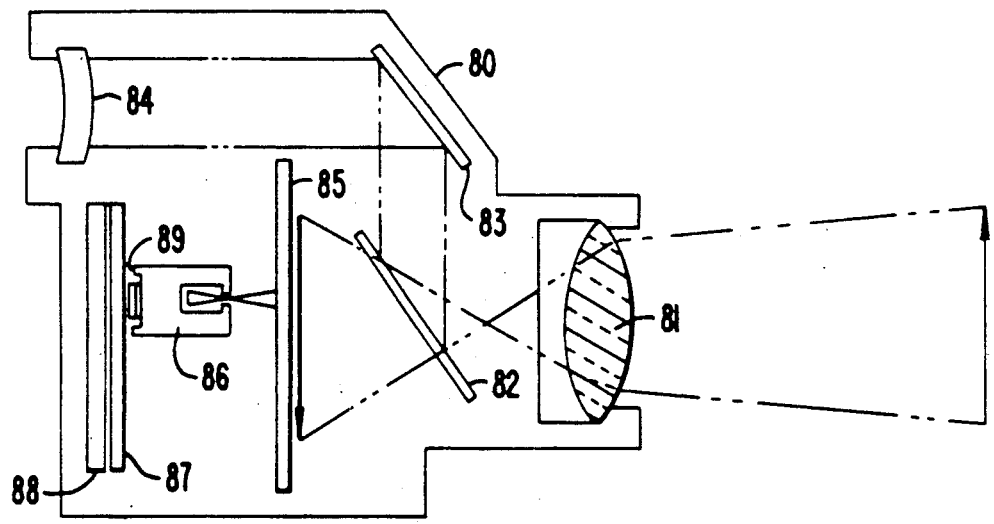
FIG._5B.

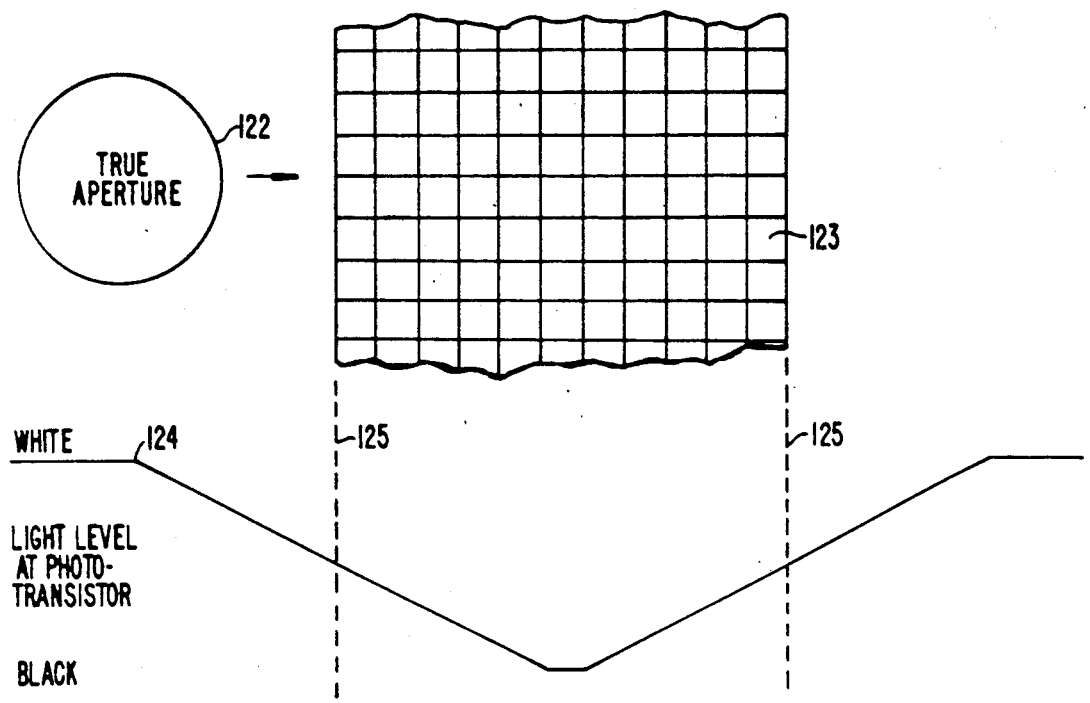
FIG._6.
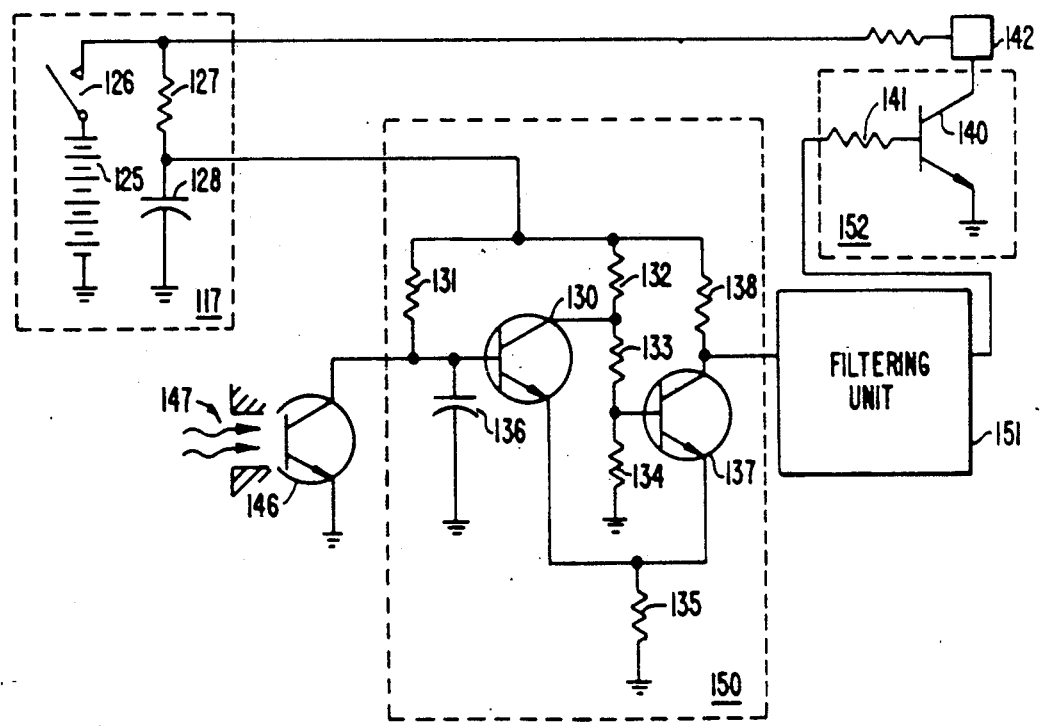
FIG._7.

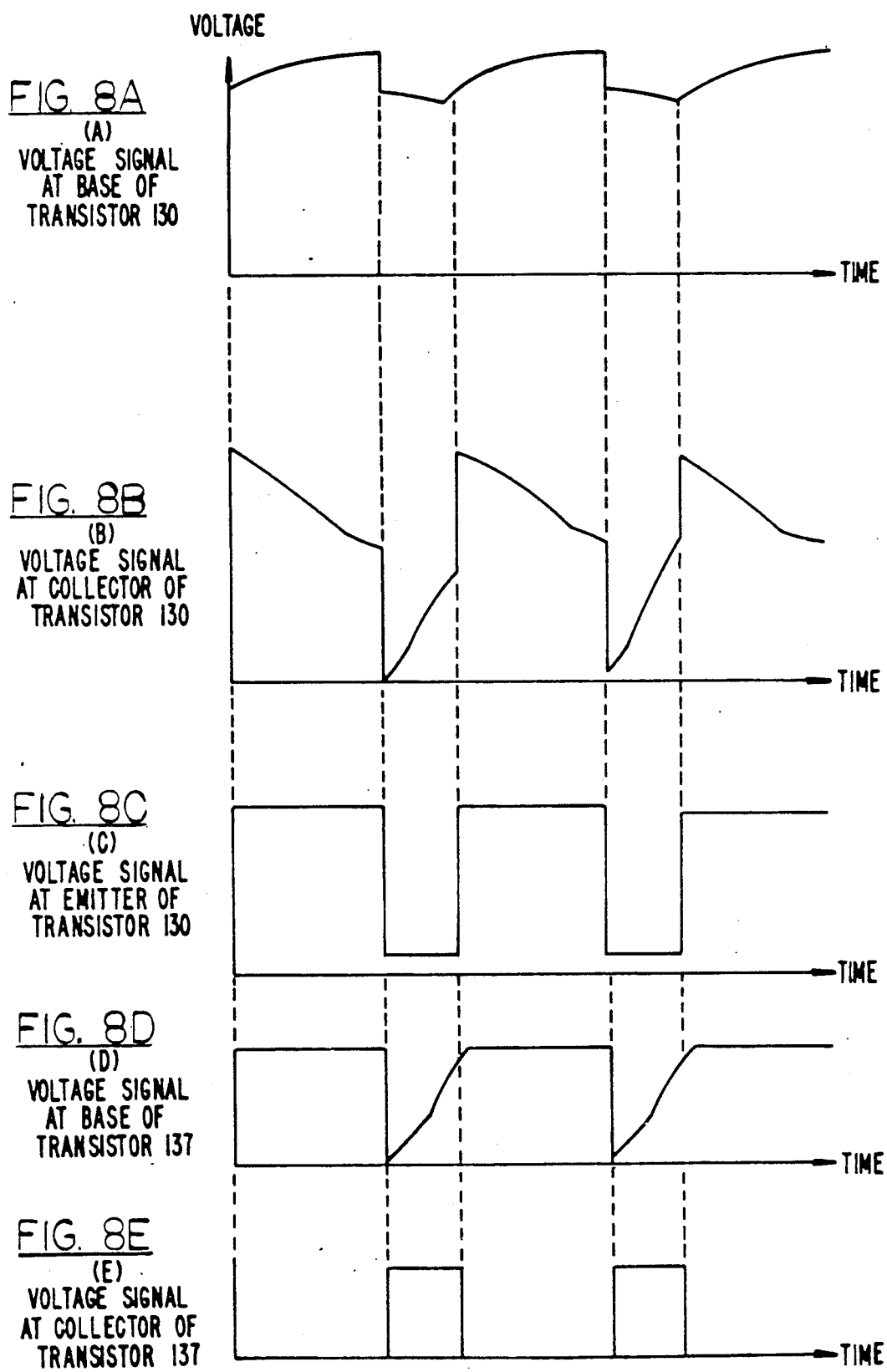

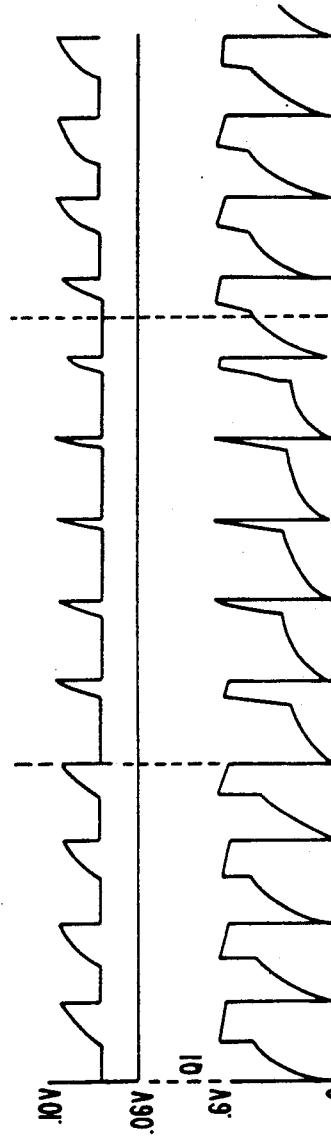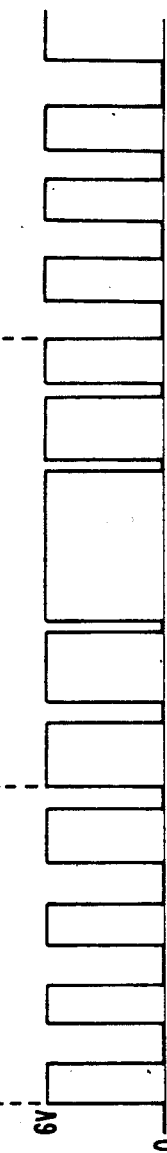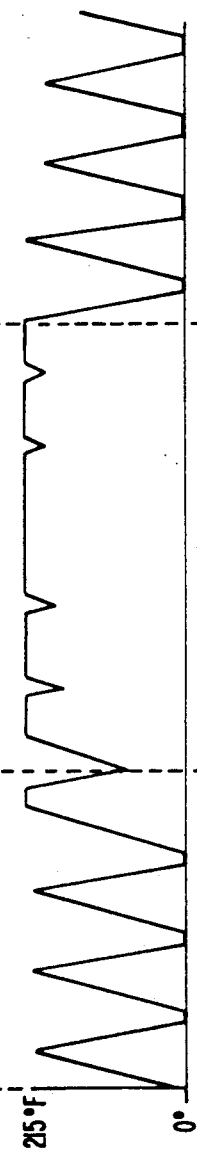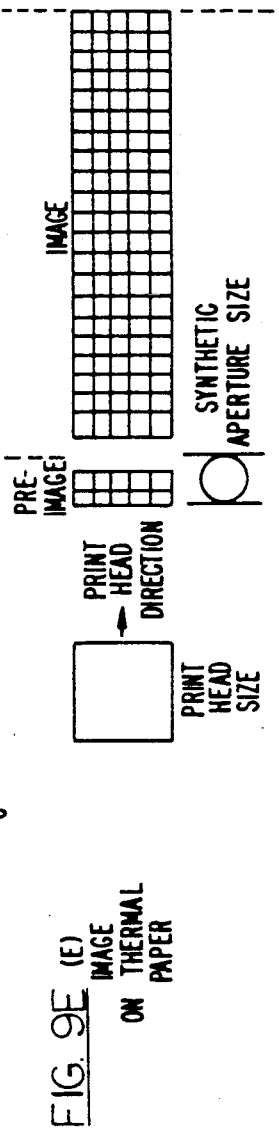

COMBINED SCANNING/REPRODUCING HEAD

FIELD OF THE INVENTION

The present invention is related to systems by which objects are viewed by scanning and by which images are reproduced by scanning and, more particularly, to highly compact and integrated scanning imaging systems.

BACKGROUND OF THE INVENTION

Scanning systems have one or both functions of viewing objects and reproducing images of the objects on a medium. "Scanning" refers to the typical point-by-point method by which an object is viewed or an image is reproduced. An example of a scanning system which is used to "read" or view a restricted range of objects is the bar code reader which is often found in retail merchandising stores. With the sale of an item of merchandise, the reader is passed over a pattern of bars, the "object," attached to the item for a nearly instantaneous access of price information and an update of sales and inventory information.

An example of scanning system which is used to reproduce images is television. A television set uses a raster scan technique for creating images on the screen of a cathode ray tube.

The present invention is directed toward a scanning imaging system, i.e., a system by which an object is viewed by the system and an image is created by scanning. In general, the organization of a scanning imaging system has a radiation source element which directs radiation toward the viewed object, a detector element which receives the radiation reflected by the object and converts the radiation into electrical signals, an element for processing the electrical signals, and an imaging element for converting the processed signals into an reproduced image of the object.

Heretofore, scanning imaging systems have had different combinations of a detector element scanning the object with a source of radiation to perform the viewing function. Such combinations have included a detector element scanning with the radiation source element fixed with respect to the object or even with the radiation source element completely eliminated (where, for example, ambient light is used in place of the radiation source), or the detector element fixed and the radiation source element performing the scanning function.

In these systems the radiation source element, the detector element, and the reproduction element are treated as separate units of the system. In a few instances, the viewing elements (the source element and detector element) have been combined into one scanning unit, such as in the case of a bar code reader discussed above. However, the need for highly compact and integrated scanning imaging systems remains largely unsatisfied.

The present invention satisfies this need for a scanning imaging system which is not only compact, but also easily manufacturable and thus low in cost, high in performance with low power requirements. The present invention has the further benefit of being able to perform the viewing and reproduction functions simultaneously or separately as is required.

SUMMARY OF THE INVENTION

The present invention provides for a scanning imaging system in which the elements necessary for object viewing (the radiation source and detector) and the element for image reproduction (the reproduction element) are combined. With the combination of these elements, both reading and reproduction functions can be performed at the same time in one scanning operation. Besides the savings in operation time from image reading to reproduction, the present invention provides for savings in space and number of parts for a compact and low cost system. The system consumes less power since the scanning operation is performed once for both reading and reproduction functions.

Applications of the present invention include facsimile machines and photocopy machines which are highly compact and low-cost. For example, the present invention permits photocopy machines which are not required to employ expensive stepper motors or encoders for the scanning operation. Simple D.C. motors, mechanical springs and even manual power are sufficient.

Still another application is electronic photography. Thus the uses for the present invention are many.

BRIEF DESCRIPTION OF THE DRAWINGS

A detailed and more comprehensive understanding of the present invention may be achieved by perusing the following Detailed Description of Preferred Embodiments and the following drawings:

FIG. 1 illustrates the general organization of one embodiment of the scanning imaging system of the present invention.

FIG. 2A is a perspective view of a facsimile machine utilizing the present invention; FIG. 2B is a cross-sectional view of the facsimile machine in FIG. 2A.

FIG. 3A is a perspective view of photocopier utilizing the present invention in which original document and copy are arranged in opposition to each other; FIG. 3B is an exploded view of the scanner assembly of FIG. 3A; and FIG. 3C is a detailed view of the scanning head and subunits of FIG. 3B.

FIG. 4A is a perspective view of a pocket photocopier in the form of a mouse utilizing the present invention; FIG. 4B is a top view of the same photocopier, while FIG. 4C is a cross-sectional view.

FIG. 5A is a perspective view with broken away portions of an electronic camera using the present invention; FIG. 5B is a cross-sectional view of the camera of FIG. 5A.

FIG. 6 illustrates the problem of resolution posed by the width of an viewing aperture.

FIG. 7 is an embodiment of the synthetic aperture circuit of the present invention.

FIG. 8 shows the signal wave forms at various points of the periodic signal generation unit of FIG. 3.

FIG. 9 shows the modulation of the signal wave forms of FIG. 8 by the amount of light received through the viewing aperture.

DETAILED DESCRIPTION OF PREFERRED EMBODIMENTS

FIG. 1 illustrates the various elements in a scanning imaging system according to the present invention. The system scans an object 10 and produces an image 12 of the object 10 on a medium 11, such as paper. The system in FIG. 1 has a radiation source element 13 which is coupled with a scanning element 14 for the scanning operation. The radiation source element 13 produces radiation 18A from the scanning element 14 to strike the object 10. The radiation, typically light, is reflected by the object 10 and the reflected radiation 18B is received by a detector element 15 and transformed into electrical signals. The electrical signals are processed by a signal processing element 16 for a reproduction element 17, which is responsive to the signals. The reproduction element 17 is coupled to the scanning element 14 and reproduces the image 12 on the medium 11 as the object 10 is scanned.

Heretofore, the elements associated with the viewing function and the reproduction function have remained disparate in operation. The radiation source element and detector element have been attached to one scanning element to view an image of an object, while the reproduction element has been attached to another scanning element to reproduce the object's image.

As illustrated in FIG. 1, the present invention combines the viewing elements and reproduction element into one scanning head. Thus one scanning operation can perform both the reading function and the reproduction function. This combination lowers the number of parts for manufacture and reduces the amount and time of labor for assembly and as a result, reduces the cost of a scanning imaging system. Operationally, the present invention permits highly compact designs with high performance. For example, the viewing and reproduction functions of the system can be performed simultaneously.

In the specific organization shown in FIG. 1 only the radiation source 13 of the two viewing elements is associated with the scanning element 14. The detector element 15 could also be associated with the scanning element 14. As the scanning element 14 scans the object 10 by directing radiation from the source 13 to the object 10, the scanning detector element 15 receives the reflected radiation. At the same time the reproduction element 17 creates the image 12 on the medium 11.

Still another scanning imaging system may require only the detector element 15 and reproduction element 17 to be associated with the scanning element 14. A source of radiation may not be needed in such a system. For example, the radiation could be just ambient light which is reflected off the object 10. An example of such a system is shown below in the embodiment illustrated by FIG. 5A-5C.

Facsimile Machine

The facsimile machine shown in FIG. 2A and FIG. 2B illustrates the present invention and its advantages. The facsimile machine views the images on an original paper 20 (the object to be copied in the language of FIG. 1) for transmission to another facsimile machine. The image of an object transmitted from a distant facsimile is reproduced on a second sheet 21 of paper (the medium in the language of FIG. 1). The facsimile machine has a scanning head 22 (scanning element) which contains a light emitting diode 35 (radiation source element) and a phototransistor 34 (detector element) which receives the light reflected on the sheet 20. Neither the light emitting diode 35 and phototransistor 34 are shown in FIG. 2A; both elements are shown in FIG. 2B. The phototransistor 34 is connected by a cable 28 from the scanning head 22 to a signal processing circuit (not shown) which receives electrical signals from the phototransistor 34. The signal processing circuit sends the processed signals back through the scanning head cable 28 to a thermal printhead 24 also mounted on the scanning head 22.

For viewing, the original paper 20 passes between a drive roller 30 and an idler roller 31. The copy paper 21, upon which a reproduction is to be made or "printed," passes between the drive roller 30 and an idler roller 32. The motion of the original paper 20 is in the direction of the arrow denoted as the Document Path in FIG. 2A and the motion of the copy paper 21 is as denoted by the arrow marked Copy Path. Both motions occur as the drive roller 30 is driven around its long axis by a set of drive gears, which are not shown. The design of such drive gears is well known to those skilled in the art.

The scanning head 22 is mounted so as to slide along a guide rod 23 under power by the rotation of a helix rod 25. As the helix rod 25 is rotated by a set of drive gears 26, a pin 39 in the scan printhead 22 engages the grooves in the helix rod 25 so that the scan printhead 22 moves back and forth perpendicular to the motion of the document sheet 20 and the copy sheet 21.

The position of the scanning head 22 is obtained by an encoder wheel 27 which is coupled to the drive gear 26. As the drive gear rotates in one direction or another, the encoder wheel 27 likewise rotates. As the encoder 27 rotates, a set of apertures around the edge of the encoder wheel 27 passes between an encoder unit S3 which has a light emitting diode and a phototransistor on the other side. The flickering of the light from the light emitting diode through the apertures in the encoder wheel 27 permits the encoder unit to determine in what direction the drive gear is rotating and the amount of rotation, as is known in the art.

FIG. 2B, a cross-sectional view of a facsimile machine of FIG. 2A, shows some of these details in the housing 37 of the device. The copy sheet 21 comes from a roll 38 of thermal paper. The drawing also shows a cross-section of the scanning head 22, which contains the light emitting diode 35 whose reflected light is detected by the phototransistor 34, also mounted on the scanning head 22. The phototransistor 34 is responsive to the light passing through a viewing aperture 39. Both the light emitting diode 35 and the phototransistor 34 are connected to electrical sources of power through the cable 28. The phototransistor 34 is also connected to the signal processing circuit, which is discussed below in detail.

The reproduction element is a thermal printhead 24 which is mounted on a backing 36. The backing 36 acts as a thermal sink for the heat from the printhead 24 and ensures that the marks on the paper 21 remain localized for high image resolution.

Though the description of the viewing operation of the original paper 20 has been described separately from the reproduction operation on the copy paper 21, it should be readily apparent that the combination of these two operations changes the facsimile machine previously described into a photocopy machine. The paper 21 becomes a "copy" of the original paper 20. Moreover, the present invention permits the reproduction of images upon the copy paper 21 to occur simultaneously as the original paper 20 is viewed.

Furthermore, it should be noted that possible variations to the single radiation source element and photodetectors are linear arrays of such elements. In such a case, the number of print elements corresponds to the number of arrayed elements.

Photocopy Machine

FIGS. 3A-3C illustrate a photocopy machine utilizing the present invention. The device is in and form of a flat slate for a lightweight, portable and inexpensive photocopier as shown in FIG. 3A. The machine copies the images (again, the objects according to previous language) on an original sheet onto a sheet 41 below from a roll of paper 58. The original sheet is placed on a clear plate 62 forming most of the top surface housing of the photocopier. The illustration in FIG. 3A removes most of the housing of the photocopy machine to show the internal workings of the photocopy mechanism.

The photocopy machine of FIG. 3A has a scanning assembly 60 mounted on a pair of rails 61A, 61B on the sides of the photocopy machine housing. After being pulled into a starting position at one end of the housing, the scanning assembly 60 begins operation. The pulling action also pulls the sheet 41 off the roll 58 of thermal paper. Then a scanning head 42 on the assembly 60 begins a side-to-side action between the side plates 44A, 44B. The assembly 60 drives itself in a direction perpendicular to the motion of the scanning head 42 back toward its rest position toward the roll 58. Thus, the scanning head 42 views the original sheet and copies onto the oppositely positioned sheet 41.

A more detailed view of the scanning assembly 60 and head 42 is in FIG. 3B. The scanning head 42 has two subunits 42A and 42B, one of which contains elements for viewing and the other element for reproduction. The subheads 42A and 42B are coupled together by a drive belt 45, which is powered by a belt drive roller 49A mounted to the first side plate 44A. The drive roller 49A is rotated by a set of gears 47 and a drive motor 46 which is connected to the first side plate 44A. The other end of the drive belt 45 rotates on an idler roller 49B which is, in turn, mounted to an idler arm 50. The idler arm 50 is spring-loaded so that the drive belt 45 is under constant tension.

The scanner assembly 60 drives itself perpendicularly to the reciprocal motion of the subunits 42A and 42B by a pair of drive rollers 56A and 56B which are connected by drive rod 54. The sheet 41 of copy paper is pressed against the rollers 56A, 56B by a pair of pinch rollers 60A, 60B which are respectively mounted to the side plates 44A, 44B. The scanning assembly 60 is driven in the transverse direction by the rotation of the drive rollers 56A, 56B under power of a drive motor 51A through a set of drive gears 52 until the end position is reached.

The subunits 42A, 42B slide along the guide bars 43A, 43B respectively between the side plates 44A, 44B. For movement the subunit 42A has a pair of wings cams 63A, 64A (not shown), and the subunit 42B has a second pair of wing cams 63B, 64B (not shown). Each of the wings cams of a pair have an inclined surface which face in opposite directions. The wing cams 63A, 64A on the subunit 42A engage an upper drive pin 48A attached to the upper edge of the drive belt 45. The wings cams 63B, 64B on the subunit 42B engage a lower drive pin 48B which is attached to the lower edge of the belt 45.

As the belt 45 is driven, the drive pins 48A, 48B respectively engage the wing cams on the subunits 42A, 42B. As shown in FIG. 3C the lower drive pin 48B engages one (63B) of two wings cams on the subunit 42B. The belt 45 and pin 48B drives the subunit 42B along the lower guide bar 43B until the subunit 42B encounters the side wall 44A. At this point the pin 48B slides along the inclined surface of the wing cam 63B away from the subunit 42B and off the cam 63B. The pin 48B rotates around the drive roller 49A and travels back in the opposite direction to engage the wing cam 64B (not shown) on the opposite side of the subunit 42B. The subunit 42B then is driven in the opposite direction to the second side wall 44B. Then the pin 48B disengages itself from the wing cam 64B, rotates around the idler roller 49B to engage the wing cam 63B again. In this manner the subunit 42B is driven back and forth between the two side plates 44A, 44B.

The upper drive pin 48A attached to the drive belt 45 is directly opposite from the lower drive pin 48B. In the same manner as described with respect to the subunit 42B, the subunit 42A is driven back and forth between the side plates 44A, 44B. The timing of the movement of the subunit 42A, however, is reciprocal to that of the subunit 42B.

The subunit 42A contains the elements for the viewing function, i.e., a linear array 55 of light-emitting diodes as a source of radiation and a linear array 56 of phototransistors to receive the light reflected from the original paper 40. The LED array 55 illuminates the sheet 40 through a rectangular aperture 58; the array 56 of phototransistors receives the reflected light through a second rectangular aperture 59, which is contiguous to the first aperture 58.

The subunit 42B contains the reproduction element in the form of a linear array 54 of thermal printheads. The number of printheads in the array 54 corresponds to the number of phototransistors in the array 56. Each printhead is responsive to the signals from one of the phototransistors in the subunit 42A. The connection between individual printheads and phototransistors is arranged so that images produced on the copy sheet 41 are reproductions of the images on the original sheet.

Variations of a photocopier unit may be made using the present invention. For example, where the photocopier in FIG. 3A and 3B drives the original paper past the scanning head 42 by motor power, a spring may be used.

As shown in FIGS. 4A, 4C, the present invention allows for highly compact photocopiers. The small, pocket photocopier in FIGS. 4A–4B is in the form of a "mouse" commonly used with personal computers. The pocket copier has an external housing 70 having a flat button 71 for switching the copier on. An adjustable roller switch 72 controls the contrast for the reproduction of images on the copier paper 74.

FIG. 4C shows a cross-sectional side view of the pocket copier. Internally the copier contains a roll 73 of thermal paper passing by a drive roller 77 and idler roller 76. The idler roller 76 provides the necessary backing for a scanning head 75.

The pocket copier is operated by slowly pushing the copier over an original document. As the copier is pushed forward (the direction faced by the flat button switch 71), the strip of thermal copy paper 74 is unrolled from the roll 73 past the scanning head 75. The scanning head 75 moves back and forth scanning the images on the original document below and copying the perceived images on the part of the original document covered by the pocket copier onto the copy paper 74. Power for the scanning head 75 is provided by a friction roller, which engages the document below and rotates as the copier is pushed forward.

An alternative to the moving scanning head 75 is a scanning head having a linear array of light-emitting diodes, phototransistors and thermal print elements arranged perpendicular to the motion of the pocket copier. Such a pocket copier has the advantage of a smaller number of moving parts.

Electronic Camera

The scanning imaging system of the present invention is not limited only to facsimile machines and photocopiers. FIG. 5 illustrates a camera for instant electronic photography. The camera, as shown in a perspective view of FIG. 5A, has a housing 80. The camera also has a lens 81 which focuses the image by a beam splitter mirror 82 upon a view finder 84 through a mirror 83. The beam splitter mirror 82 also permits the image to be focused upon a projection screen 85. The purpose of focusing the image on the screen 85 is to provide an image that can be easily scanned. All these elements are common to present day single lens reflex cameras.

The present invention provides additionally for a scanning head 86 which scans the focused image on the projection screen 85 and reproduces the image by a thermal printhead 89 upon a sheet of thermal paper 87. The thermal paper 87 passes between a backer 88 and the thermal printhead 89. It should be noted that since the printhead converts the focused image on the projection screen 85 to electrical signals before sending them on to the thermal printhead 89, the set of electrical signals corresponding to the focused image can be optionally stored in an electronic memory for later reproduction. Hence, the present invention permits instant electronic photography by which images can be reproduced immediately or stored for later reproduction.

FIG. 5B shows a cross-sectional view of the electronic camera of FIG. 5A to illustrate the relationship between the scanning head 86, the thermal paper 87, and the backer 88.

Signal Processing Circuit

For a signal processing element the present invention provides for a signal processing circuit which acts as a synthetic aperture circuit for increasing the resolution of an aperture receiving radiation from an object for the more accurate reproduction of an image of the object.

A problem with all scanning systems is that the aperture which receives the radiation from the object is necessarily of a finite size. Ideally, the size of the aperture should be infinitely small so that the image of the object is scanned point-by-point. Without an infinitely small aperture, the image of the scanned object is distorted. This degrades the resolution of the scanning system.

Prior efforts to improve the resolution of apertures in scanning systems have used optical components, such as lenses, optical fibers, mirrors, and prisms, to create a focused image of the object received by the scanning system. However, these components require particular attention to their shapes and the relative positioning of the components between themselves and the photodetector. All these concerns add to the cost of the scanning system.

The present invention provides for an efficient and economical way of increasing the scanning resolution of the scanning aperture without the use of optical components.

FIG. 6 illustrates this problem of aperture resolution. Since any photodetector is necessarily responsive to radiation over a certain amount of area, all scanning systems have limitations of resolution caused by the scanning aperture size, or more precisely, the width of the aperture in the scanning direction.

FIG. 6 shows a viewing aperture scanning from left to right with respect to an image 123. A line 124 indicates the amount of light being received by a photodetector, such as a phototransistor, through the aperture 122. The intensity of the light begins to drop as soon as the forward or right edge of the aperture 122 encounters the left edge of a dark object 123. As the aperture 122 continues its scan, more and more of the dark object appears before the aperture 122 and the light intensity continues to fall. When the aperture 122 is completely blanketed by the object 123 the light level reaches its minimum. However, as soon as the forward edge of the aperture 122 reaches the right hand edge of the dark object 123, the light intensity begins to rise again. The net result is that a dark image having definite edges on a white background is perceived as an image with varying shades of grey having an apparent width in the scan direction of two times the diameter of the aperture 122 plus the true width of the object 123 in the scan direction. Thus image resolution is low.

The use of a comparator to discriminate the light intensity signals into white or black at a predetermined level does not solve all the problems of restoring resolution. For example, the comparator having a discrimination level halfway between the "white" and "black" levels represented in FIG. 6 prevents features having widths up to the diameter of the aperture from being reproduced. Furthermore, techniques which can be used to detect features smaller than the aperture diameter lead to further difficulties. The discriminator can be set at level very close to the "white" level, for example. However, this leads to distortions of the reproduced image. Additional techniques which may be used to compensate for the size and direction of the features of objects to be reproduced add complexity to the scanning system.

A synthetic circuit as detailed below increases image resolution at low cost and is particularly adapted for the scanning of objects at a fixed distance from the scanning aperture, such as found in the facsimile and photocopy machines described above. For the particular embodiment discussed below, the present invention increases the resolution of the viewing aperture such that the true diameter of the aperture appears to be reduced to that of an aperture nearly one-third smaller. The size of the viewing aperture 39 in FIG. 2B and the viewing aperture 59 in FIG. 3 is effectively reduced. Resolution of the images reproduced is greatly increased.

FIG. 7 shows an embodiment of the synthetic aperture circuit of the present invention. The synthetic aperture circuit is placed in the signal processing unit 16 of a scanning imaging system, such as illustrated in FIG. 1. The circuit has basically three parts, a periodic signal generation unit 150, a filtering unit 151 and a driver unit 152, which are connected to a power supply unit 117.

The periodic signal generation unit 150 is coupled to a phototransistor 146 which receives the radiation (light) through a scanning aperture 147, which is symbolically shown. The phototransistor 146 is exemplary of the phototransistor 34 in FIG. 2B and each phototransistor in the linear array 56 in FIG. 3C. The unit 150 generates a periodic signal which has a duty cycle which is responsive to the phototransistor 146 and the amount of light the phototransistor is receiving.

The unit 150 is coupled to the filtering unit 151 which generates an output signal responsive to the duty cycle of the periodic signal. The filtering unit discriminates between "black" and "white" when the duty cycle is at a certain predetermined amount, 50%, for example. As explained below, in some embodiments a filtering unit 151 in itself is not used. However, the filtering function is still performed by other circuit elements.

The filtering unit 151 is coupled to the driver unit 152. The unit 152 conditions the output signal from the filter unit 151 to drive a reproduction element 142, such as a thermal printhead discussed with respect to the facsimile and photocopy machines above, or even an acoustic unit for modem communication over telephone lines.

The particular details of the periodic signal generating unit 150 are as follows. A first transistor 130 has its base electrode connected to the collector electrode of the phototransistor 146. The base electrode of the transistor 130 is also connected through a resistor 131 to the power supply 117 and connected to ground through a capacitor 136. The emitter electrode of the transistor 130 is connected to ground through a resistor 135, while the collector electrode of the transistor 130 is connected to the power supply 117 through a resistor 132.

The unit 150 also has a second transistor 137 which has its base electrode connected to the collector electrode of the transistor 130 through a resistor 133 and connected to ground through another resistor 134. The emitter electrode of the transistor 137 is connected in parallel to the emitter electrode of the transistor 130 to ground through the resistor 135. The collector electrode of the transistor 137 is connected through a resistor 138 to the power supply 117.

A periodic signal is generated by the switching of the first transistor 130 "off" and "on" (in the sense of operating the transistor in the linear region where it can be saturated, or respectively biased to an off condition) through the charge and discharge of the capacitor 136. The second transistor 137 operates to amplify the output signal of the transistor 130 in a complementary fashion, i.e., when transistor 130 is high, the output of the second transistor 137 is low and when the transistor 130 is low, the output of the transistor 137 is high.

The operation of the unit 150 is illustrated in FIGS. 8A-8E which details the waveforms of the voltage signals at various nodes of the circuit 150 having particular values for the circuit elements. The transistors 130, 137 are discrete transistors, part no. 2N2222, with the resistor 131 having an adjustable value of 500 to 1000 Kohms, the resistor 132 having a value of 4.7 Kohms, the resistor 133 1 Kohms, the resistor 134 6.7 Kohms, the resistor 135 47 ohms, and the resistor 138 1 Kohms. The capacitor 136 has a capacitance of 10 pFs. It should be noted that the resistance 131 is adjustable to provide an adjustable contrast for the images to be reproduced.

Assuming that the transistor 130 is off, the capacitor 136 and the base electrode of the transistor 130 begins to charge by the current through the resistor 131 and the leakage current through the resistor 132 and reverse biased collector-base junction of the transistor 130. The voltage at the base electrode becomes higher and higher as the capacitor 136 charges until the transistor 130 turns on. At this point the voltage at the base electrode drops and the discharge of the capacitor begins. Since the transistor 130 is now on, the current through the resistor 132 is such that the voltage on the base electrode of the second transistor 137 is lowered to turn that transistor off. With the transistor 137 off, the amount of current through the resistor 135 is decreased which permits further discharge of the capacitor 136. Finally, the discharge of the capacitor 136 is such that the voltage on the base electrode of the transistor 130 is so low so that the transistor 130 turns off and the charging of the capacitor 136 begins once more. The charge and discharge cycle of the base electrode of the transistor 130 is shown in FIG. 8A.

The output signal at the collector electrode of the transistor 130 is shown in FIG. 8B. When the transistor 130 is biased nominally off, the voltage at the collector electrode (the voltage between resistors 132 and 133) drops as the charge at the base electrode of the transistor 130 builds. This voltage drop is due to the fact that the transistor 130 is not truly off, but actually operating in the linear region. Thus, more and more current is drawn through the resistor 132 as the charge on the capacitor 136 builds until the transistor 130 is saturated on. At this point, the voltage of the collector electrode drops near ground.

After the initial surge through the transistor 130, less current enters the base of the transistor 130 and the amount of current drawn through the resistor 132 and the collector electrode falls, thereby causing the voltage at the collector electrode to rise. The rise continues until the transistor 130 is "biased off" in its linear region. The charge on the capacitor 136 once again builds for another cycle.

FIG. 8D illustrates the state of the transistor 137. When the transistor 130 is fully off, the transistor 137 is on and the voltage at the base electrode of the transistor 137 is a constant, due to the base-emitter voltage drop and the small resistance of the resistor 135. When the transistor 130 is on and the transistor 137 is off, the base electrode of the transistor 137 tracks the voltage of the collector electrode of the transistor 130 because the transistor 137 is off.

The resulting output signal of the transistor 137 is shown in FIG. 8E. Note that the signal now is more or less a square wave with the signal high when the transistor 130 is on and the transistor 137 is off. The original signal at the base of the transistor 130 of a few tenths of a few hundredths of a volt has been amplified to a voltage swing of about 6 volts and shaped into a square wave format.

Images are picked up by the modulation by the phototransistor 146 of the signal at the base electrode of the transistor 130. The amount of incident radiation received by the phototransistor 146 turns the transistor 146 off and on to thereby affect the rate of charging of the capacitor 136. When a large amount of incident radiation is received by the phototransistor 146, for example, the scanning of a white area, more time is required for the capacitor 136 to charge. This is due to the fact that the phototransistor 146 diverts some of the current through the resistor 131 and the resistor 132 (through the reversed biased base-collector junction of the transistor 130).

This modulation of the charging cycle of the capacitor 136 (as the scanning aperture 147 makes the white-to-black-to-white transitions of FIG. 6) is shown in FIG. 5A. What results is a modulation of the length of time the output signal from the collector of the transistor 137 is high. That is, the duty cycle of the periodic signal generated is modified by the amount of light received by the phototransistor 146. It should be noted, though, that the period of the cycle is not necessarily constant. It has been found to change by approximately 20%. This modulation of the duty cycle of the output of the unit 150 is used to resolve the image which is received through the scanning operation of the phototransistor 146.

The modulated signal from the periodic signal generation unit 150 is fed into the filtering unit 151. The filtering unit 151 operates as a low-pass filter, a type of circuit well known to those skilled in the electronic circuit field. The unit 151 transmits a signal to the driver unit 152 indicative of a "black" reading when the duty cycle of the modulated signal of the unit 150 exceeds a certain level. At this point the driver unit 152 switches to turn on the reproduction element 142.

The filtering operation of the modulated periodic signal from the unit 150 can be performed by specialized circuits, such as a circuit for pulse width modulation to generate either audio and electrical signals for modem signals according to CCITT T1 or T2 standards. A linear array of phototransistors 146 with corresponding periodic signal generation units 150 can be used for the higher performance CCITT T3 applications.

The filtering unit 151 may even be eliminated in certain applications, such as in lower performance photocopy machines. FIG. 9D illustrates the heat of a thermal printhead which is used as the reproduction element 142. The printhead receives the signal from the driver transistor 140 of the driver unit 152, which in turn receives the modulated signals directly from the periodic signal generation unit 150 without the intervention of the filtering unit 151. As indicated by the sawtooth wave forms, the printhead has a definite response time, i.e., a time for the print head to heat up to a maximum temperature and then fall. By a matching of the RC time constant and frequency of the unit 150 and the response time of the print head, the print head itself, the output device, acts as a filtering circuit which is responsive to the particular duty cycle from the output signal on the circuit 150. As indicated in FIGS. 9C and 9D, the thermal head remains on to a greater or lesser degree when the duty cycle of the output signal exceeds a certain amount. The image is reconstructed upon heat-sensitive paper matched to the thermal head. In this way, the output device and the filtering circuit are combined into one. Filtering is performed thermally, rather than electronically.

Matching or adjustment of the particular thermal printhead (with its particular thermal mass) to the sensitivity of the thermal paper and the scanning speed of the printhead also improves the reproduced image. By a proper matching it is possible to create image features on the thermal paper which are narrower than the width of the printhead. FIG. 9E illustrates a possible effect in the present imaging system. A "pre-image" appears before the image proper due to the heating cycle of the printhead as it reaches the image. By a matching the pre-image can be minimized. The pre-image is smaller than the size of the printhead and is indicative of the resolution of the matched printhead.

The net result for the embodiment above is that an imaging aperture of 0.021 inches operates as an aperture of only 0.0085 inches in diameter. The apparent or synthetic aperture has resolution three diameters finer than its true size. This technique has the further advantage that the imaging aperture is not required to contact the viewed object, such as the case of bar code readers. In the case of facsimile machines and photocopiers, the present invention allows the aperture to be displaced 0.125 inches or greater from the original document surface thereby avoiding many problems if contact were required.

Thus, by matching the requirements of a particular scanning system with the actual limitations of the phototransistor and its output device, the present invention can effectively reduce the aperture of a scanning head in the scanning direction for a very high degree of resolution.

The resolution of the circuit is dependent upon the period of oscillation of the transistor 130. This period is dependent upon the charge and discharge cycle of the capacitance element 136, which is determined by the RC time constant for the periodic signal generation unit 50, where C is the capacitance of the capacitance element 136 and R is the total resistance of the current path charging the element 136. The RC time constant for a particular application is determined by multiplying the desired resolution, the dots per inch, by the scan rate, the speed at which the scan head moves across the area to be scanned. This product yields a maximum image frequency. The maximum image frequency is multiplied by an arbitrary factor, say 3, to provide an adequate resolution. This yields the required RC time constant. It should be noted that this is a theoretical calculation and that in practice the response time of the phototransistor 146 must be accounted for. Furthermore, the response time of the device reproducing the scanned object must also be considered as discussed above. If the response time of the phototransistor or the image reproduction device is too long, then it cannot provide the desired resolution of the image which is reproduced.

The frequency of the periodic signal can be increased by making the capacitance element 136 smaller. The reduction in capacitance reduces the RC time constant and makes the frequency of the oscillation of the transistor 130 higher. However, a practical limitation of about 1 pF for capacitance element 136 exists for the particular discrete element embodiment of the periodic signal generation unit 150 discussed previously. For smaller capacitances and higher frequencies, an integrated circuit form of the periodic generation unit 150 avoids many of the problems of higher frequency, such as parasitic capacitances and uncertain response times of the transistors. In an integrated circuit parasitic capacitances may be accounted for and used as a capacitance element.

At higher frequences the wave forms of the signals of the previously discussed embodiment of the unit 150 are essentially the same as those in FIG. 9 with some variation in the period and amplitude of the signals. The particular shapes of the signals are also slightly different. Most of these changes can be attributed to the peculiarities of the response of the transistors 130, 137. The linear bias and switching regions shift with frequency. Also, the magnitude of the signals produced diminish with greater speed (slew rate). However, the circuit remains operational if these variations are accounted for.

It should also be evident that while the synthetic aperture circuit has been described with respect to a single phototransistor (and single print head), the circuit can be applied to linear arrays of phototransistors (and print heads), such the portable photocopy device of FIGS. 3A, 3B and 3C.

Therefore, while the present invention has been described with respect to particular embodiments, the present invention should be considered limited only by the meets and bounds of the appended claims.

What is claimed is:

1. A system for reproducing on a medium an image of an illuminated object, said system comprising:

means for detecting reflected illumination from said object by scanning in a first plane, said means generating signals responsive to the detected illumination, means for processing signals from said detecting means, wherein said signal processing means includes means for increasing the resolution of said detecting means, and means associated with said detecting means and responsive to said processing means, for reproducing images in a second, non-coplanar, plane fixed with respect to said first plane on said medium, whereby said reproducing means creates said image on said medium by the scanning of said detecting means, and whereby, said reproducing means creates said image as said detecting means scans said object thus requiring no storage of the signal generated by said detecting means.

2. The system as in claim 1 wherein said resolution increasing means comprises a circuit responsive to signals from said detecting means, said circuit having means coupled to said detecting means for generating a periodic signal, the duty cycle of said periodic signal responsive to said detecting means; and means coupled to said generating means for generating an output signal responsive to said duty cycle.

3. The system as in claim 2 wherein said detecting means comprises a phototransistor.

4. The system as in claim 2 wherein said output generating means is responsive only to said periodic signals with duty cycle greater than a predetermined amount.

5. The system as in claim 4 wherein said output generating means comprises a low pass filter circuit.

6. The circuit as in claim 4 wherein said output generating means is an output device for forming said image of said object.

7. The circuit as in claim 6 wherein said output generating means comprises a thermal printhead.

8. The circuit as in claim 2 wherein said periodic generating means comprises a first transistor having a collector electrode coupled to a first reference voltage source and an emitter electrode coupled to a second reference voltage source, and base electrode coupled to a first resistive means and capacitive means, whereby said first transistor switches off and on periodically with the charging and discharging of said capacitive means.

9. The circuit as in claim 8 wherein said capacitive means comprises parasitic capacitance at said first transistor base electrode.

10. The circuit as in claim 9 wherein said first resistive means and said capacitive means are connected serially between said first and second reference voltage sources and said transistor base electrode connected between said resistive and capacitive means.

11. The circuit as in claim 10 wherein said first resistive means is connected to said first reference voltage source and said capacitive means is connected to said second reference voltage source.

12. The circuit as in claim 8 further comprising a second transistor having a collector electrode coupled to said first reference voltage source, an emitter electrode coupled to said second reference voltage source and a base electrode coupled to said collector electrode of said first transistor so that said second transistor operates to amplify the signal at said first transistor collector electrode.

13. The circuit as in claim 12 further comprising an output terminal connected to said collector electrode of said second transistor for connection to said output generating means.

14. The circuit as in claim 12 wherein said first transistor collector electrode is connected to said first reference voltage source through a second resistive means, said first transistor collector electrode also connected to said second transistor base electrode through a third resistive means, and said second transistor base electrode base electrode further connected to said second reference voltage source through a fourth resistive means.

15. The circuit as in claim 12 wherein said emitter electrodes of said first and second transistors are connected to said second reference voltage source through a fifth resistance means.

16. A system for reproducing a document onto paper, said system comprising:

means for scanning said document in one plane, said scanning means having means for illuminating said document and means for detecting images on said document by the illumination reflected from said document, said detecting means generating signals responsive to said images;

means for processing signals from said detecting means wherein said signal processing means includes means for increasing the resolution of said detecting means, and means associated with said scanning means and responsive to said processing means, for reproducing said images on said paper, said paper oriented in a predetermined manner with respect to said document, whereby said reproducing means creates said images on said paper by the operation of said scanning means, and whereby, said reproducing means creates said image on said paper as said scanning means scans said document, thus requiring no storage of the signal generated by the processing means.

17. The system as in claim 16 wherein said resolution increasing means comprises a circuit having means coupled to said detecting means for generating a periodic signal, the duty cycle of said periodic signal responsive to said detecting means; and means coupled to said generating means for generating an output signal responsive to said duty cycle.

18. The system as in claim 17 wherein said detecting means comprises a phototransistor.

19. The system as in claim 17 wherein said output generating means is responsive only to said periodic signals with duty cycle greater than a predetermined amount.

20. The system as in claim 19 wherein said output generating means comprises a low pass filter circuit.

21. A system for reproducing on a medium an image of an illuminated object, said system comprising:

means for detecting reflected illumination from said object by scanning in a first plane, said means generating signals responsive to the detected illumination, means for processing signals from said detecting means, and means associated with said detecting means and responsive to said processing means, for reproducing images in a second, non-coplanar, plane fixed with respect said first plane on said medium, whereby said reproducing means creates said image on said medium by the scanning of said detecting means, and whereby, said reproducing means creates said image as said detecting means scans said object thus requiring no storage of the signal generated by said detecting means wherein said first plane and said second plane are parallel, and wherein said medium comprises paper, said illuminated object comprises a document and said system is a photocopier, and wherein said detecting means is mounted on a first scanning head, which first scanning head is slidably mounted on a first guide bar, and said reproducing means is mounted on a second scanning head, which second scanning head is slidably mounted on a second guide bar, and wherein said first and second scanning heads are reciprocally driven during operation, and wherein said first and second scanning heads are driven by a single belt.

22. A system for reproducing on a medium an image of an illuminated object, said system comprising:

means for detecting reflected illumination from said object by scanning in a first plane, said means generating signals responsive to the detected illumination, means for processing signals from said detecting means, and means associated with said detecting means and responsive to said processing means, for reproducing images in a second, non-coplanar, plane fixed with respect to said first plane on said medium, whereby said reproducing means creates said image on said medium by the scanning of said detecting means, and whereby, said reproducing means creates said image as said detecting means scans said object thus requiring no storage of the signal generated by said detecting means, and further comprising a lens focusing said reflected illumination upon a screen coincident with said first plane.

23. The system as in claim 22 wherein said screen is between said detecting means and said lens.

24. The system as in claim 23 wherein said system comprises a camera.

* * * * *